June 16, 1925.                                                          1,542,077
J. C. MOORE
HEADLIGHT AND SIGNAL CONTROL FOR VEHICLES
Filed July 2, 1921
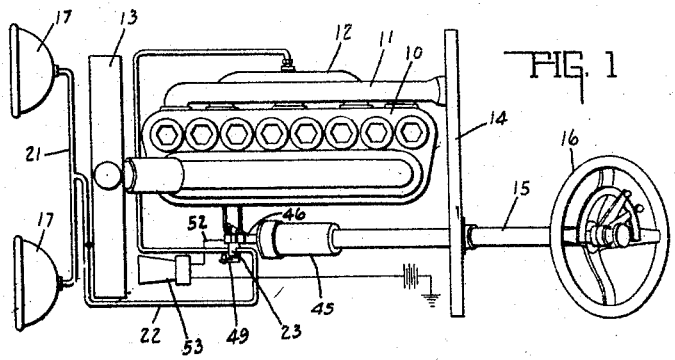
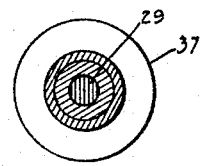
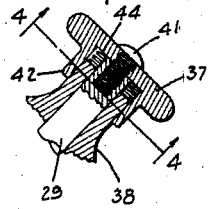
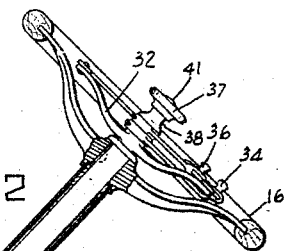
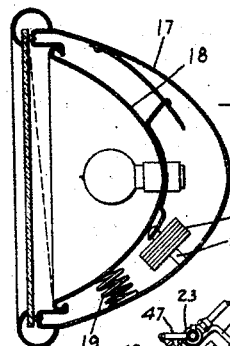
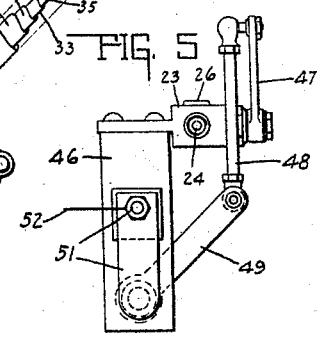
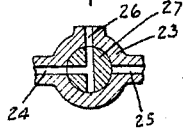
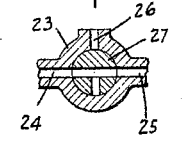
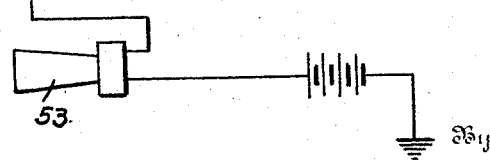
Inventor
JOHN C. MOORE
Attorneys Patented June 16, 1925.

1,542,077

UNITED STATES PATENT OFFICE.

JOHN C. MOORE, OF CONNERSVILLE, INDIANA.

HEADLIGHT AND SIGNAL CONTROL FOR VEHICLES.

Application filed July 2, 1921. Serial No. 482,052.

*To all whom it may concern:*

Be it known that I, JOHN C. MOORE, a citizen of the United States, and a resident of Connersville, county of Fayette, and State of Indiana, have invented a certain new and useful Headlight and Signal Control for Vehicles; and I do hereby declare that the following is a full, clear, and exact description thereof, reference being had to the accompanying drawings, in which like numerals refer to like parts.

This invention relates to a combined signal and headlight operating means mounted on the steering wheel of a vehicle adapted to be used in connection with the tilting reflector control disclosed in Patent No. 1,256,284, issued February 12, 1918, for automobile headlight control.

The object of this invention is to provide a single means most conveniently located and accessible to the driver, for actuating both the horn signal and tilting the reflector in the head lamps.

Another feature of the invention consists in the arrangement of the controlling mechanism near the steering column, whereby the control may be actuated through a button mounted in the center of the steering wheel, which is the usual location for the horn button.

The full nature of this invention will be understood from the accompanying drawings and the following description and claims.

In the drawings Fig. 1 is a plan view looking down on the steering wheel post showing the actuating means in connection therewith and its electrical connection with the horn signal and headlights. Fig. 2 is a side elevation of the steering post showing a portion thereof in section with parts broken away. Fig. 3 is a central vertical section through the top of the steering post and operating button. Fig. 4 is a section taken on the line 4—4 of Fig. 3. Fig. 5 is an enlarged plan view looking toward the bottom of the control mechanism, as shown in the lower portion of Fig. 2. Fig. 6 is an enlarged section showing the two way valve in closed position. Fig. 7 is the same as Fig. 6 showing the valves in open position. Fig. 8 illustrates an enlarged central vertical section through one of the lamp casings.

In the drawings there is shown that part of a motor vehicle comprising the cylinder blocks 10, casing 11, intake manifold 12, radiator 13, dash 14, steering column 15, steering wheel 16 and head lamps 17, all of the usual construction.

The head lamps 17 are of that type embodying a tilting reflector 18 pivotally mounted therein for reflecting a beam of light in front of the vehicle substantially parallel with the rod, when in its vertical or tilted position, and throwing the beam down at an angle to the road so as to strike the road a short distance in front of the vehicle when in its normal forwardly tilted position. For maintaining the reflector in its normally forward tilted position, there is provided a spring 19, and for overcoming said spring and returning said reflector to its vertical position, there is provided a bellows 20.

The bellows 20 is in communication with a common tubular passage 21 which communicates with the intake manifold 12 through the tubular passage 22. Intermediate of the ends of the passage 22 there is a three way valve housing 23 having oppositely disposed passage ways 24 and 25 in communication with the tube 22 and a passage 26 extending at right angles thereto in said opening in to the atmosphere. The valve member 27 is provided in the usual manner with passages adapted to open the communications between the passages 24 and 25 when in open position, see Fig. 7, and close the communication between said passages and open the communication between the passage 24 and the atmosphere through the passage 26 when in closed position, shown in Fig. 6. The passage 24 communicates through the tube 22 with the tube 21 and the bellows 20, whereas the passage 25 communicates through the tube 22 with the intake manifold 12. It will, therefore, be evident that when the valve is in open position, as shown in Fig. 7, the suction created by the motor, when in operation, will create a vacuum through the valve and tubes 21 and 22 so as to cause the bellows 20 to collapse and maintain the tilting reflector 18 in its vertical position for throwing the beam of light substantially parallel with the road when driving in the country. For city driving, or when passing other vehicles, the reflector is returned to normal or downwardly tilted position for throwing the beam downward, by the spring 19 upon the valve being closed, as shown in Fig. 6, shutting off the vacuum and opening the bellows to atmospheric pressure through the passage 26.

For operating said valve so as to control the actuation of the tilting reflector, there is provided a rod 29 extending through the steering post 15. The steering post is of the usual construction embodying the steering tube 30 which is secured to the steering wheel 16. The tube 31 is mounted within the tube 30 for supporting the segment 32 and through said tube the throttle controlling tube 33 extends, which is secured to the throttle lever 34. The tube 35 extends through the tube 33 for controlling the spark and is secured to the spark lever 36. The rod 29 is contained within the tube 35 and is rigidly secured to the button 37 mounted at the top of the steering post centrally of the wheel. The upper end of the rod is movably supported in the bearing 38 formed in an extension of the spark lever hub. The button 37 is secured to the rod 29 by the bolt 41 and is provided with a downwardly extending skirt portion 42 adapted to embrace the end of the bearing 38. A button 37 is telescoped over the bearing 38, and the rod 29 is slidable in said bearing so that the button and rod may be pressed down with respect to said bearing for making the contact and sounding the horn signal. The usual spring 44 is maintained between the button and the bearing for normally maintaining said button in spaced relation thereto for breaking the signal contact. Secured to the steering gear housing 45 at the lower end of the post there is a bracket 46 for supporting the valve housing 23. The valve 27 contained in said housing is controlled by the lever 47 for turning it to closed or open position through the movement of the rod 48 actuated by the lever 49 mounted on the rod 29. The bracket 46 supports the contact point being connected through the cable 52 to the electric horn 53.

By means of this construction when it is desired to blow the horn signal the button 37 is pressed downward in the usual manner so as to make contact at 51 and close the circuit to the electric horn. Upon releasing the button the spring 44 returns it to normal position, breaking the contact.

When it is desired to operate the tilting reflector the button 37 is turned about its axis. When in one position the reflector will be tilted forwardly and downwardly, because of the valve being closed as shown in Fig. 6 and the forward pressure exerted by the spring 19. When turned in the other direction, the valve will be opened and the vacuum created by the intake will cause the bellows to collapse and overcome the spring 19 so as to return the reflector to its vertical position.

The button 37 and rod 29 will remain in fixed position after operation so that the valve will maintain the reflector in either the downward or tilted position by the friction of the various parts, especially the valve member 27, within the valve housing 23. For limiting the movement the usual steps are incorporated in the valve and valve housing so as to limit the movement thereof.

The invention claimed is:

1. The combination with a vehicle having a steering post, and movable means for projecting a beam of light on the ground at different distances from the vehicle, of a single means for independently operating said signal and moving said movable means including a rod and means for slidably and rotably mounting said rod on said steering post.

2. The combination with a vehicle having a steering post, a vacuum actuated tilting reflector, an electric signal, and a source of electrical energy, of means for independently controlling the actuation of the signal and tilting reflector, including a rod extending through said steering post, means at the lower end of the rod for controlling the action of said reflector when said rod is turned, and means adjacent the lower end of said rod for making electrical contact with said signal when said rod is moved longitudinally.

3. The combination with a motor vehicle having an engine, a steering post, a horn signal, a vacuum controlled tilting reflector headlight, a valve communicating with said headlight and intake for controlling the movement of said reflector, and a source of electrical energy, of a single means for independently controlling the actuation of said horn signal and headlight, comprising an actuating rod extending through said steering post, means for operatively connecting said rod with said valve, and a contact point for closing a circuit between said source of energy and said horn signal, means for slidably and rotatably mounting said rod to permit it to move longitudinally to close said contact point and operate said signal and to rotate for opening or closing said valve for actuating said tilting reflector.

4. The combination with an internal combustion engine, and movable means for projecting a beam of light on the ground at different distances from the vehicle, of means for actuating said movable means, an electric horn signal, a source of electrical energy, a steering post having a steering wheel thereon, means for operating said horn and for controlling the actuating means including a rod extending through said post, means positioned on said rod adjacent to the steering wheel for operating the same, a connecting member on said rod connected with said movable means for actuating the same when the rod is actuated in one direction, and a contact member associated with said rod for making electrical connection between said source of energy and signal when said rod is actuated in another direction.

In witness whereof, I have hereunto affixed my signature.

JOHN C. MOORE.